United States Patent
Kanteti

(10) Patent No.: US 11,030,155 B2
(45) Date of Patent: Jun. 8, 2021

(54) KEY VALUE FILE SYSTEM

(71) Applicant: Samsung Electronics Co., Ltd., Suwon-si (KR)

(72) Inventor: Kumar Kanteti, Mountain View, CA (US)

(73) Assignee: Samsung Electronics Co., Ltd.

( * ) Notice: Subject to any disclaimer, the term of this patent is extended or adjusted under 35 U.S.C. 154(b) by 987 days.

(21) Appl. No.: 15/645,916

(22) Filed: Jul. 10, 2017

(65) Prior Publication Data

US 2017/0316028 A1 Nov. 2, 2017
US 2018/0039650 A9 Feb. 8, 2018

Related U.S. Application Data

(60) Provisional application No. 62/490,297, filed on Apr. 26, 2017.

(51) Int. Cl.
*G06F 16/17* (2019.01)
*G06F 16/14* (2019.01)
*G06F 16/185* (2019.01)

(52) U.S. Cl.
CPC ........ *G06F 16/1727* (2019.01); *G06F 16/148* (2019.01); *G06F 16/1724* (2019.01); *G06F 16/185* (2019.01)

(58) Field of Classification Search
CPC .. G06F 16/148; G06F 16/1727; G06F 16/185; G06F 16/1724
See application file for complete search history.

(56) References Cited

U.S. PATENT DOCUMENTS

| | | |
|---|---|---|
| 5,388,257 A | 2/1995 | Bauer |
| 9,135,287 B2 | 9/2015 | Castellano |
| 9,292,207 B2 | 3/2016 | Cheng |
| 9,378,067 B1 | 6/2016 | Agarwala et al. |
| 2011/0137966 A1 | 6/2011 | Srinivasan et al. |

(Continued)

OTHER PUBLICATIONS

Wu et al., "An Efficient B-Tree Layer for Flash-Memory Storage Systems," Department of Computer Science and Information Engineering National Taiwan University, Taipei, Taiwan, pp. 1-20.

*Primary Examiner* — James Trujillo
*Assistant Examiner* — Kurt A Mueller
(74) *Attorney, Agent, or Firm* — Innovation Counsel LLP

(57) ABSTRACT

A file system includes: an application programming interface (API) configured to provide a file system access to an application running on a host computer; a key value file system configured to represent a file or a directory as an inode including one or more key-value pairs; a virtual file system configured to direct a file system call received from the application to the key value file system; and a key value API configured to provide the file system access to data stored in a data storage device. Each key-value pair contained in the inode includes a name of the file or the directory as a key and an identifier of a container that is associated with the file or the directory as a value. The data of the file is stored in the data storage device as being divided into one or more data blocks of a fixed size, and each of the one or more data blocks associated with the data of the file is accessible within the key value file system using the one or more key-value pairs.

24 Claims, 7 Drawing Sheets

(56) References Cited

U.S. PATENT DOCUMENTS

| | | |
|---|---|---|
| 2013/0103729 A1* | 4/2013 | Cooney ............. G06F 16/24568 707/831 |
| 2015/0286657 A1* | 10/2015 | Vaghani .............. G06F 16/9017 707/829 |
| 2015/0302111 A1 | 10/2015 | Yue et al. |
| 2016/0063008 A1 | 3/2016 | Benight |
| 2016/0078052 A1 | 3/2016 | Srivas et al. |
| 2016/0099810 A1 | 4/2016 | Li et al. |
| 2016/0283498 A1 | 9/2016 | Beaverson et al. |
| 2016/0378845 A1 | 12/2016 | Sivasubramanian et al. |

\* cited by examiner

KEY VALUE FILE SYSTEM

CROSS-REFERENCE TO RELATED APPLICATION(S)

This application claims the benefits of and priority to U.S. Provisional Patent Application Ser. No. 62/490,297 filed Apr. 26, 2017, the disclosure of which is incorporated herein by reference in its entirety.

TECHNICAL FIELD

The present disclosure relates generally to a file system for a data storage system, more particularly, to a file system utilizing key-value pairs to represent files and directories.

BACKGROUND

A file system of a computer system uses a namespace and manages files and directories of the file system. The namespace allows applications running on the computer system to access data by traversing directories to get to a desired file stored in a data storage device.

The namespace also maintains caches and organizes data stored on the data storage device to allow applications to obtain faster access to the data. For example, a large directory including many files can be spread across many data blocks on the data storage device. Managing the data blocks requires multiple levels of metadata. To lookup an entry (e.g., a file or a directory) in the large directory, the namespace needs to traverse all the metadata of the large directory. Hence, traversing a large directory involves execution of multiple inputs/output (I/O) operations to the data storage device that stores the entry.

The file system also maintains dirty data. The file system typically makes several round trips to the data storage device to allocate data blocks for the dirty data and the associated metadata in the cache. The dirty blocks are periodically flushed to the data storage device via synchronous threads running on a host computer. The host computer can employ various algorithms to optimally flush dirty data from cache to the data storage device. The file system also manages free and used data blocks in conjunction with the metadata. The performance of the file system depends on the efficiency of data being written to the data storage device. The file system can efficiently allocate and free data blocks on the data storage device to achieve the optimal performance.

The file system can get fragmented as data is written on the data storage device. The fragmented file system may run in a fragmented mode executing random I/O operations to the data storage device. Some file systems may support data defragmentation and regrouping data in contiguous data blocks to improve the I/O performance. However, a conventional file system consumes significant host central processing unit (CPU) cycles to perform data block management and defragmentation of data stored in a data storage device.

SUMMARY

According to one embodiment, a file system includes: an application programming interface (API) configured to provide a file system access to an application running on a host computer; a key value file system configured to represent a file or a directory as an inode including one or more key-value pairs; a virtual file system configured to direct a file system call received from the application to the key value file system; and a key value API configured to provide the file system access to data stored in a data storage device. Each key-value pair contained in the inode includes a name of the file or the directory as a key and an identifier of a container that is associated with the file or the directory as a value. The data of the file is stored in the data storage device as being divided into one or more data blocks of a fixed size, and each of the one or more data blocks associated with the data of the file is accessible within the key value file system using the one or more key-value pairs.

According to another embodiment, a method includes: storing a file or a directory in a data storage device as an inode including one or more key-value pairs in a key value file system; receiving a file system access request from an application running on a host computer; directing the file system access request to a file system call to the data storage device; and providing the file system access to data stored in the data storage device. Each key-value pair contained in the inode includes a name of the file or the directory as a key and an identifier of a container that is associated with the file or the directory as a value. The data of the file is stored in the data storage device as being divided into one or more data blocks of a fixed size, and each of the one or more data blocks associated with the data of the file is accessible within the key value file system using the one or more key-value pairs.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
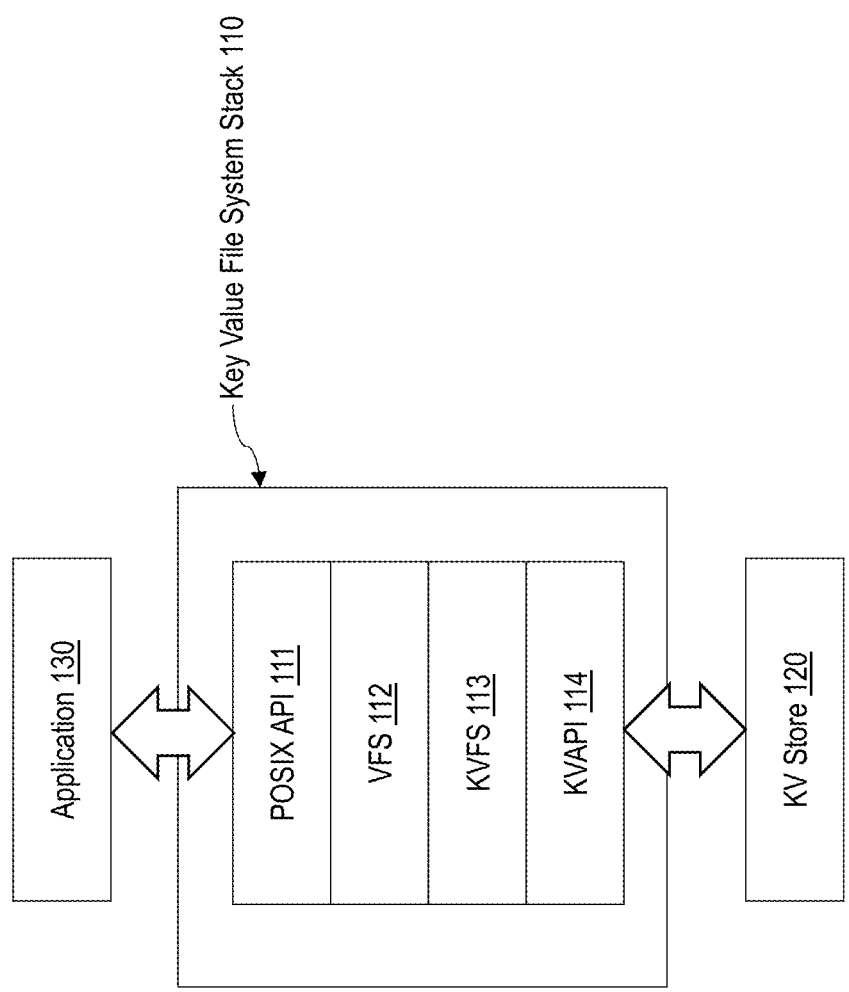
FIG. 1 shows layers of an example key value file system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a key value file system and a method of managing files and directories using the key value file system. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a key-value file system (KVFS) that operates on a data storage device. Herein, the data storage device on which the KVFS is operated is referred to as a key-value (KV) store, a KV drive, or a KV solid-stated drive (SSD). The present disclosure further describes a method for organizing and managing data in a KV store using a KV namespace. The data storage space stores data of a file and a directory in one or more key-value pairs contained in one or more inodes and provides efficient management of directories and files of the file system using the key-value pairs.

The present KVFS can offload data block management from a host CPU to a KV store. The I/O operations to access data stored in the KV store can be reduced in the present KVFS. The host CPU does not need to allocate and free data blocks of the KV store. In addition, the KVFS does not need to explicitly perform defragmentation to improve the efficiency of data storage in the KV store.

The present KVFS maintains hierarchical data structures that are persisted on the KV store for organizing the KV namespace. By using containers in a KV store, the present KVFS can perform a lookup of a directory or a file inside the directory in a single I/O operation. A conventional file system is required to traverse multiple levels of metadata to get a file resulting in several I/O operations.

A conventional system maintains metadata in a form of indirect blocks to support large files. Supporting large files involves maintaining a cache for the indirect blocks. Truncating a file involves traversing all the indirect blocks to free them resulting in several round trips from the host to the data storage device. The present KVFS provides containers in the KV store and offloads the truncate operation completely to the KV store. The present KVFS can perform a truncate operation in a single I/O operation.

FIG. 1 shows layers of an example key value file system (KVFS), according to one embodiment. The KVFS stack 110 includes a portable operating system interface for Unix (POSIX) application programming interface (API) 111, a virtual file system (VFS) 112, a key-value file system (KVFS) 113, and a key-value API (KAPI) 114. Although the present example shows that the KVFS stack 110 includes the PDXIS API 111 implying that the underlying operating system (OS) is Unix, it is understood that operating systems other than Unix can include the present KVFS 113 without deviating from the scope of the present disclosure.

The KVFS 113 can access data stored in a KV store 120 using the KVAPI 114 that provides interfaces with the KV store 120. The KVAPI 114 supports an interface to generate a unique identifier for each directory and file stored in the KVFS stack 110. The unique identifier can be used as an inode name or an inode number. In one embodiment, the KVAPI 114 can be implemented as a device driver running within the KVFS 113 to access data stored on the KV store 120. Depending on the type of KV stores 120, one or more KVAPI 114 may be provided by the KVFS stack 110.

The KVFS 113 implements different VFS interfaces exposed by an operating system (e.g., Linux) and runs in a kernel of the operating system (e.g., a Linux kernel). The KVFS integrates into an existing file system stack and uses the KVAPI 114 to access the KV store 120. An application 130 that is POSIX-compliant can run over the VFS 112 via the POSIX API 111. The application 130 can make standard VFS calls to obtain access to the KV store 120 via the KVAPI 114. The KVFS stack 110 allows the application 130 to use standard VFS calls to access the KV store 120 via the POSIX API 111, therefore no changes are required to the application interface. The VFS calls by the application 130 destined to the KV store 120 can be directed to the KVFS 113 and the KVAPI 114.

According to one embodiment, the KVFS 113 can construct and manage inodes to represent files or directories in the KVFS stack 110. Each file or directory in the KVFS stack 110 can be represented by a corresponding inode. According to one embodiment, the KVFS 113 uses a key-value pair to represent an inode. In the case of files, the inode can represent the key itself. A lookup for an inode is a lookup for a key.

According to one embodiment, attributes of an inode can also be stored in the key value of the key-value pair corresponding to the inode. The size of the attributes may be fixed when an inode is created. Retrieval of an inode involves retrieval of a key-value pair corresponding to the inode and reading a key value of the key-value pair. If the attributes of the inode is stored in the key value, the attributes of the inode can also be read when the key-value pair is retrieved. The storage of the attributes and key value of an inode in the same key value can improve the performance of the KVFS stack 110. Alternatively, attributes of an inode can be stored in a different key value other than the key value corresponding to the inode. In this case, the retrieval of the attributes may involve two separate accesses to the first key-value pair corresponding to the inode itself and the second key-value pair that stores the attributes.

According to one embodiment, a key-value pair representing an inode includes a name and an inode, i.e., (name, inode), in the KVFS stack 110. The name is the file/directory name that a user creates, and the inode is the key that the KVFS stack 110 allocates as described above. The name of a directory key-value pair can be stored in multiple formats and fields. For the ease of explanation, a directory entry including a single name entry is used in the following examples.

Figure 2:
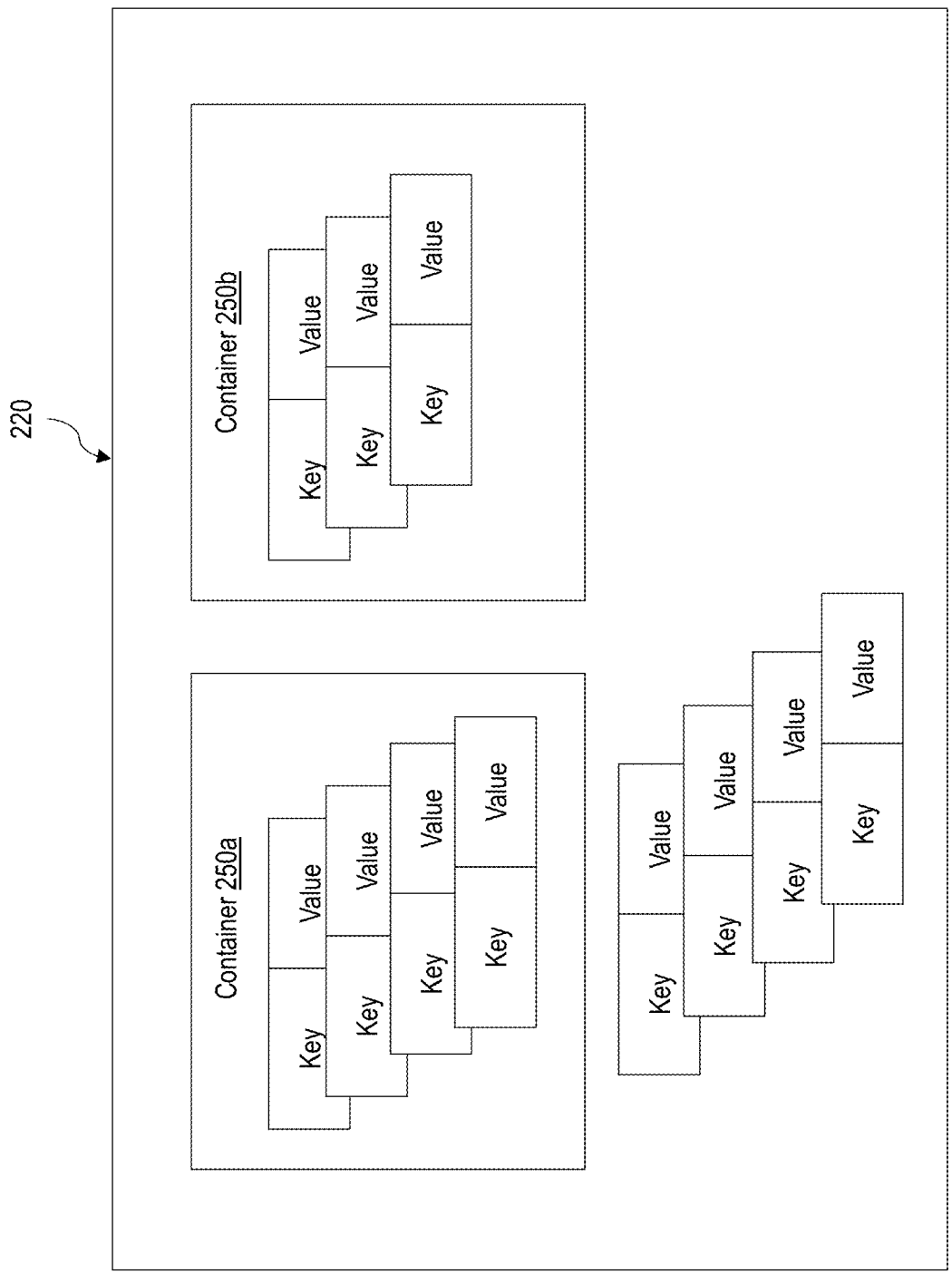
FIG. 2 shows a block diagram of an example key value store, according to one embodiment.

FIG. 2 shows a block diagram of an example key value store, according to one embodiment. The KV store 220 can include multiple containers 250a and 250b, and each container can store data in a plurality of key-value pairs. Some key-value pairs may be global key-value pairs that do not belong to any container. Any two containers may have the same key.

The KVFS stack 110 uses file system metadata including a namespace. The namespace includes directories and files. The KVFS stack 110 manages block metadata including the management of free blocks and offload the metadata block management to the KV store 120.

A root directory is a special directory in the KVFS stack 110 that is a known key. The root directory is a starting point for a path traversal to a file or a directory of the KVFS stack 110.

The KVFS stack 110 can manage a directory either as a key-value pair or a container including a plurality of key-value pairs. According to one embodiment, the KVFS stack 110 supports inline directories and container directories depending on the number of the entries in the directories.

Figure 3:
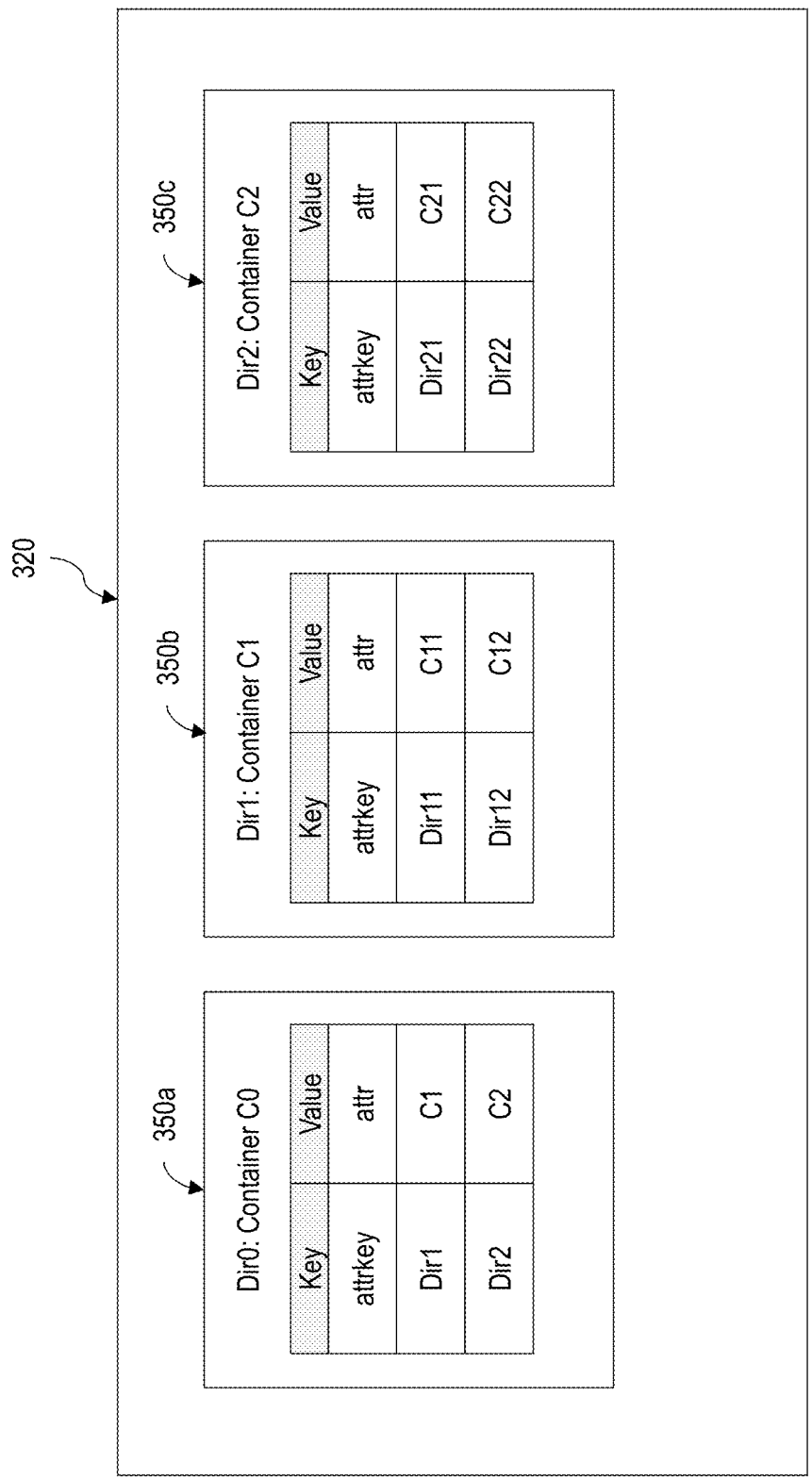
FIG. 3 shows an example key value store for container directories, according to one embodiment.
Figure 4:
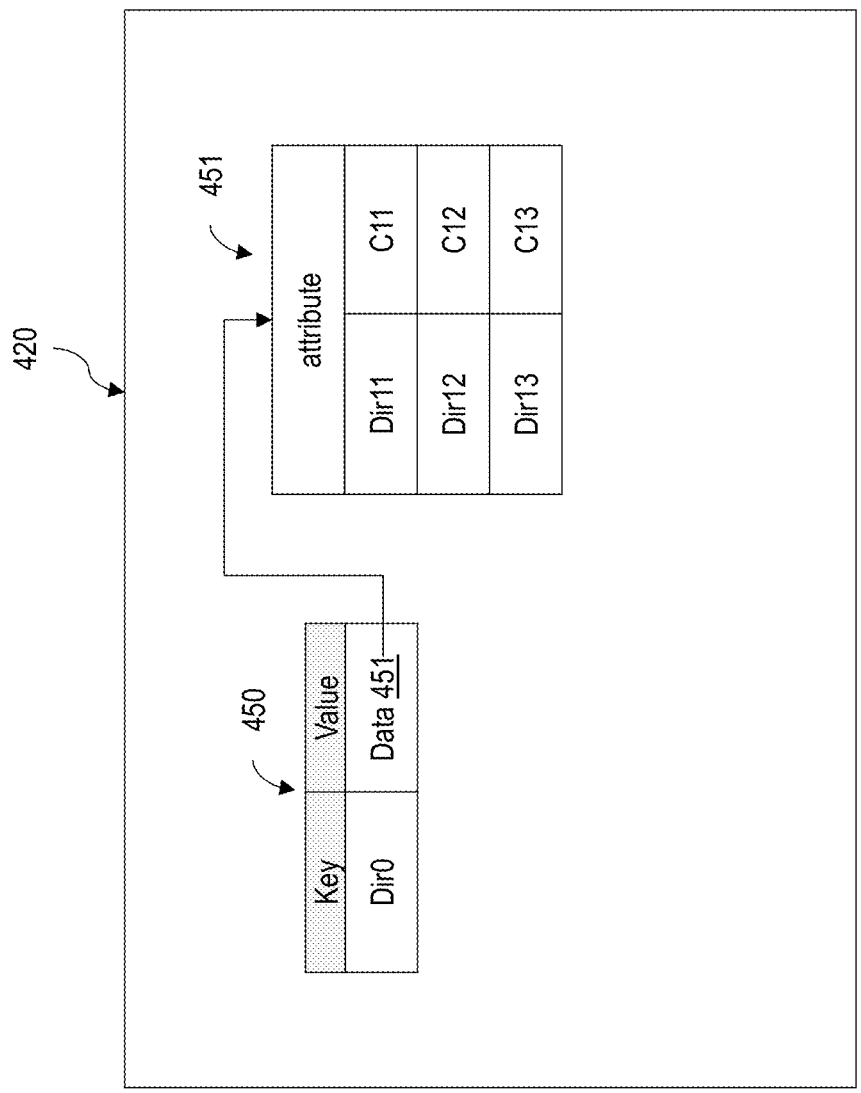
FIG. 4 shows an example key value store including an inline directory, according to one embodiment.

FIG. 3 shows an example key value store for container directories, according to one embodiment. In the present example, the KV store 320 includes three inodes 350a, 350b, and 350c. Each of the inodes 350a, 350b, and 350c represents a container directory containing more than one subdirectories. It is understood that any number of container directories may be present in the KV store 320 without deviating from the scope of the present disclosure. In some embodiment, the KV store 320 can include a mix of container directories and inline directories as shown in FIG. 4.

Attributes of a directory, in a container directory, are stored in a special key-value pair. The actual attributes are stored in the value portion of the key-value pair. The attribute values of the container directory can include various parameters pertaining to the container directory such as a permission, an owner, a group, etc.

According to one embodiment, the present KVFS uses a container directory (e.g., container directories 350a, 350b, and 350c) when a directory contains a large number of entries (e.g., subdirectories and files). The container directory represented as an inode (e.g., inode 350a, 350b, or 350c) of the KVFS is stored in the KV store 320. Files and subdirectories contained in the container directory can be stored as key-value pairs. A key-value pair (key, value) includes a key and the corresponding value. For example, the key of a key-value pair is the name of a file or a directory (or subdirectory), and the value of the key-value pair is an identifier of a container that is associated with the file or the directory. To access a file in the KVFS, the KVFS can execute an I/O operation to look up a container corresponding to the name of a file or a directory that is to be accessed. Depending on the number of entries required to access the file, the same number of I/O operations may be required. For example, if a file is stored in root/dir1/dir11 in the KVFS, three I/O operations are required to access the file including I/O operations for each directory root, dir1, and dir11. The lookup operation can be offloaded to the KV store 320 irrespective of the number of entries to get to the target file or directory.

The KVFS exposes individual key-value pairs stored in a container using their names. A key-value pair can be an entry to another container (e.g., a container of a subdirectory). The name of the key-value pair is used as a key that can be searched in the namespace of the KVFS, and the value of the key-value pair is used to store information about the corresponding key. The value can be an identifier of an inode that is identifiable in the namespace of the KVFS. The directory attributes can be stored as a special key-value pair in the container. Each container directory may include one or more special key-value pairs to store the attributes of the container.

Referring to FIG. 3, the inode 350a represents the container C0. The container C0 is identified as "Dir0" in the namespace of the KVFS. The directory Dir0 includes a plurality of key-value pairs including an attribute key-value of itself and two additional key-value pairs for the two subdirectories Dir1 and Dir2 included in the directory Dir0. The key-value pair for the subdirectory Dir1 has a name "Dir1" as the key and "container C1" as the value. The container C1 corresponds to another inode 350b in the KVFS. The key-value pair for the subdirectory Dir2 has a name "Dir2" as the key and "container C2" as the value. The container C2 corresponds to another inode 350c in the KVFS.

The container C1 is identified as "Dir1" in the namespace of the KVFS. The container C1 includes a plurality of key-value pairs including an attribute key-value of itself and two additional key-value pairs for the two subdirectories Dir11 and Dir12. The key-value pair for the subdirectory Dir11 has a name "Dir11" as the key and "container C11" as the value. The key-value pair for the subdirectory Dir12 has a name "Dir12" as the key and "container C12" as the value. The containers C11 and C12 correspond to another inodes (not shown) in the KVFS.

The container C2 is identified as "Dir2" in the namespace of the KVFS. The container C2 includes a plurality of key-value pairs including an attribute key-value of itself and two additional key-value pairs for the two subdirectories Dir21 and Dir22. The key-value pair for the subdirectory Dir21 has a name "Dir21" as the key and "container C21" as the value. The key-value pair for the subdirectory Dir22 has a name "Dir22" as the key and "container C22" as the value. The containers C21 and C22 correspond to another inodes (not shown) in the KVFS.

FIG. 4 shows an example key value store including an inline directory, according to one embodiment. In the present example, the KV store 420 includes a single inode 450. The inode 450 represents an inline directory identified as "Dir0" in the namespace of the KVFS. It is understood that any number of directory containers may be present in the KV store 420 without deviating from the scope of the present disclosure. In some embodiment, the KV store 420 can include a mix of inline directories and container directories.

According to one embodiment, the KVFS can use an inline directory when the number of entries in a directory is small. The inline directory is stored in a single key-value pair. The name of the key-value pair is a key for the inline directory Dir0 that can be searched in the namespace of the KVFS. The value of the key-value pair can hold data 451 including attributes of the inline directory Dir0 and multiple key-value pairs. The key-value pairs in the data 451 can include attributes of the inline directory Dir0 and one or more key-value pairs for each of the subdirectories (e.g., Dir11, Dir12, and Dir13) included in the inline directory Dir0. For example, the attributes of the inline directory Dir0 are stored in the first 512 bytes of the data 451. The values of the key-value pairs corresponding to the containers C11, C12, and C13 for the subdirectories Dir11, Dir12, and Dir13. The containers C11, C12, and C13 correspond to another inodes (not shown) in the KVFS.

The maximum number of the entries that can be included in the inline directory Dir0 can be fixed when the inline directory is created. The KVFS looks up a name of an inode (e.g., files and directories) by looking up the values of the key-value pairs to find the inode associated with the name. The inode can be a key to a file or a subdirectory in the inline directory Dir0. The attributes of a file or a subdirectory can be read to determine the type of the file or the subdirectory. The lookup for a name inside the inline directory Dir0 is bounded because the maximum number of entries in the inline directory is fixed.

According to one embodiment, an inline directory can be converted to a container directory when the number of entries exceeds a threshold size. Similarly, a container directory can be converted to an inline container when the number of entries is reduced below the threshold size. For example, the threshold size is 64.

According to one embodiment, the present KVFS supports both inline files and container files depending on the size of a file. A large file can be stored as a container file, and a small file can be stored as an inline file.

Figure 5:
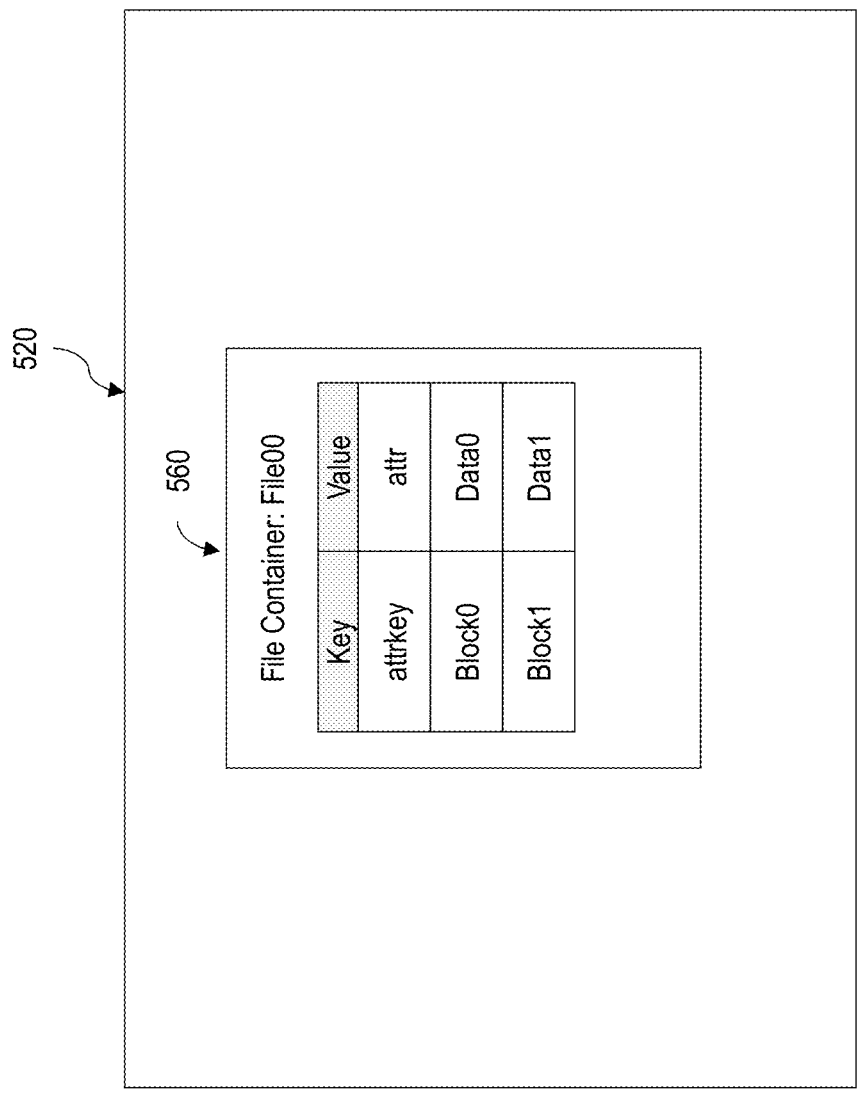
FIG. 5 shows an example key value store including a container file, according to one embodiment.

FIG. 5 shows an example key value store including a container file, according to one embodiment. A container file named "File00" is an inode of the KVFS. The container 560 can hold all data associated with the container file File00 including attributes and one or more data blocks storing the data. The attributes of the container file File00 is stored at the beginning of the container file 560 as a special key. The data of the container file File00 may be stored in one or more key-value pairs. Each of the key-value pairs includes a block number as the key and the associated data as the value. For example, if the file system block size is 4 kB, block0 can hold data from 0-4 kB, block 1 can hold data ranging from 4 kB-8 kB, etc. As the size of the container filer gets bigger, more blocks can be added in the container 560. According to one embodiment, the value of each key-value pair can point to another key in a different container on the same KV store 520 or a different KV store.

According to one embodiment, the KV store 520 supports updates to key-value pairs of the container file File00. File truncation of the container file File00 can be offloaded completely to the KV store 520. When truncating the data of the container file File00, the KVFS can delete the data and the associated blocks within the container. In this case, there is no need to traverse the keys to truncate or delete the container file File00. When truncating the data of a container file including data blocks in containers in multiple file containers or multiple KV stores, the truncated data may be deleted by accessing each data blocks containing the truncated data. The maximum number traversals to delete or truncate a data block is determined by the number of I/O operations to access the data block.

Figure 6:
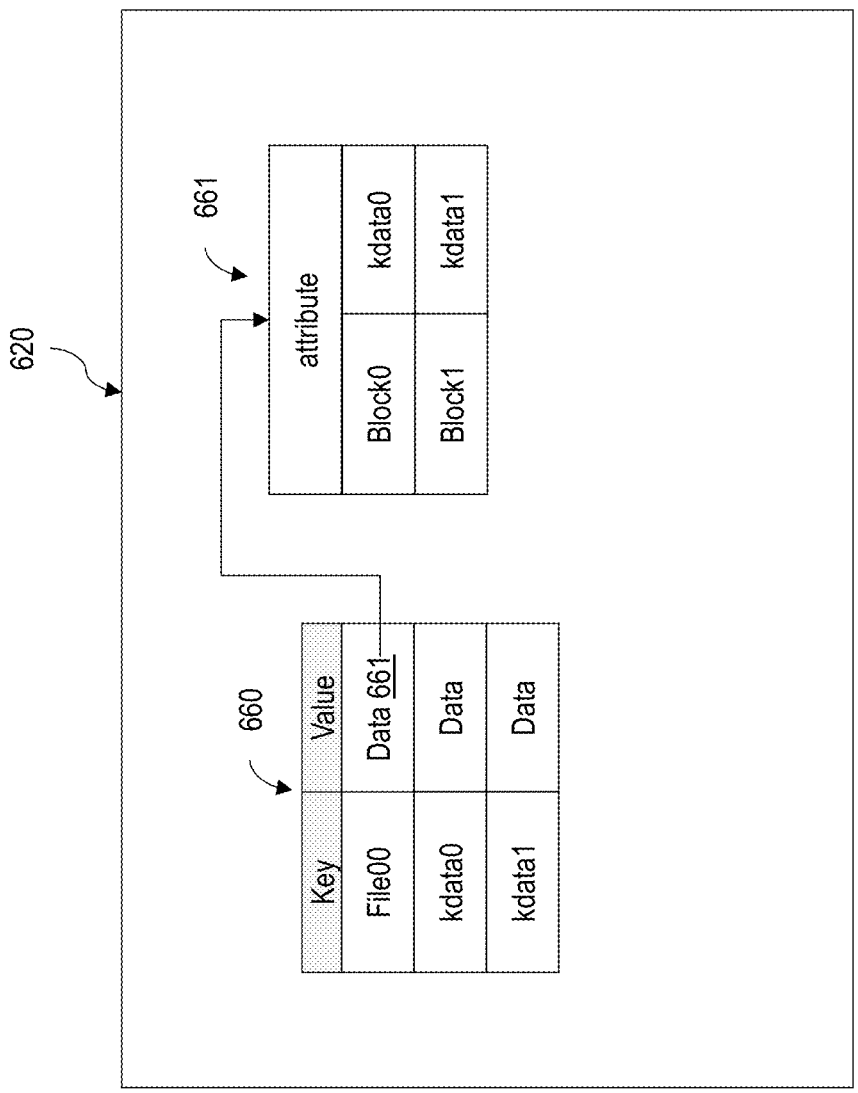
FIG. 6 shows an example key value store including an inline file, according to one embodiment.

FIG. 6 shows an example key value store including an inline file, according to one embodiment. The inline file FF00 is stored in a file container 660 of the KV store 620. The file container 660 is an inode of the KVFS. Similar to an inline directory, the inline file FF00 can be stored in a single key-value pair. The key of the key-value pair is the inode name "File00", and the value of the key-value pair holds data 661 associated with the inline file. The attributes of the node are stored at the beginning of the data 661, and the data of the inline file FF00 is stored in one or more key-value pairs of a fixed size. Depending on the size of the file FF00, the data of the file FF00 can be split into multiple data blocks. Each of the key-value pairs contained in the data 661 can include a name of the data block as the key and the data associated with the data block as the value. For example, the data of the inline file File00 is divided into two data blocks Block0 and Block 1. Block0 is stored with the key "kdata0," and Block1 is stored with the key "kdata1." The size of the data blocks in the inline file can be fixed, for example, 4 kB. In this case, Block0 holds data ranging 0-4 kB and Block1 holds data ranging 4 kB-8 kB.

According to one embodiment, an inline file exceeding a predetermined file size (or the number of entries of a fixed sized data blocks exceeding a threshold), for example, 1 MB, can be converted to a container file. Similarly, a container file reduced to a file size smaller than the predetermined file size can be converted to an inline file.

Figure 7:
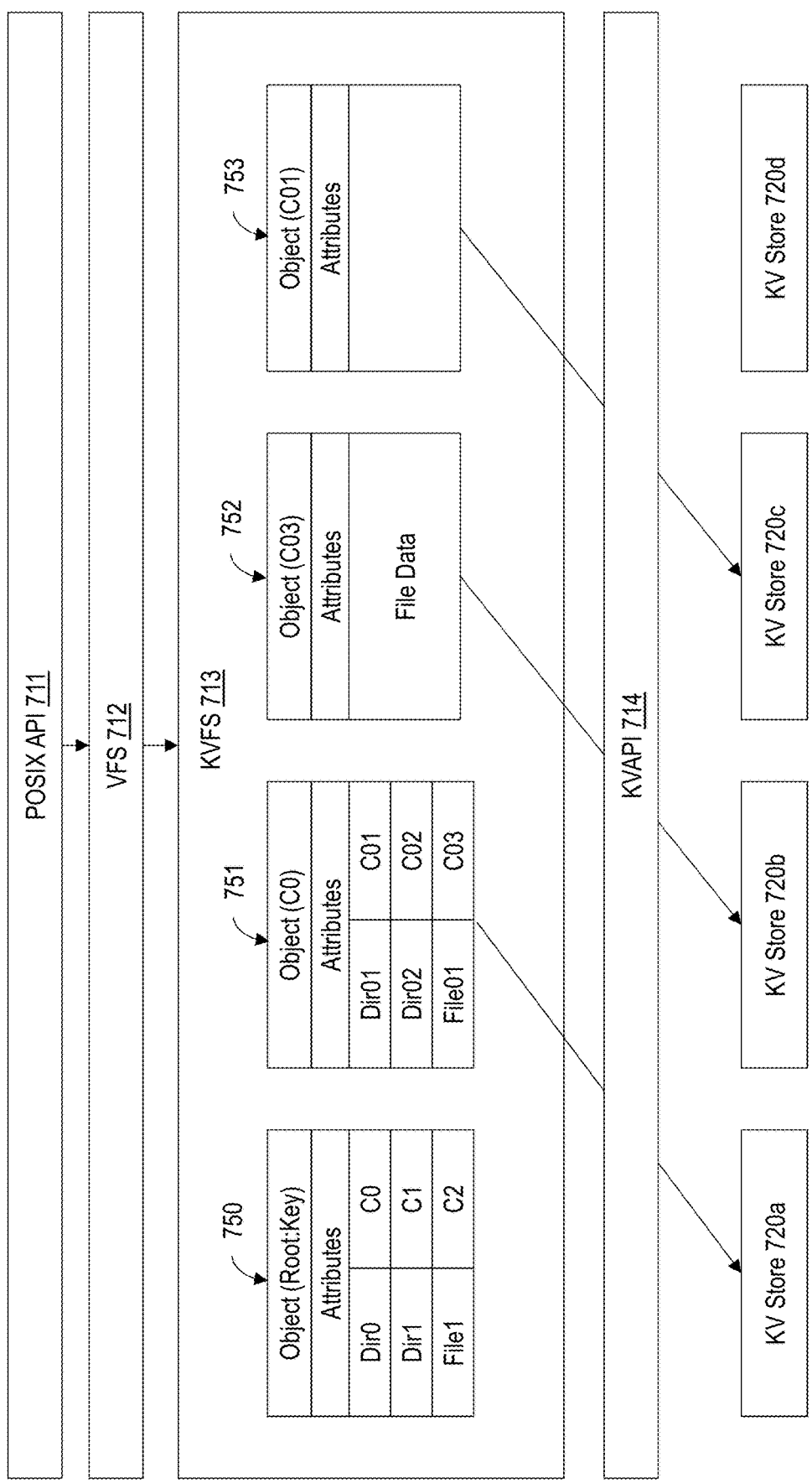
FIG. 7 illustrates distributed data and a path traversal in an example key-value store, according to one embodiment.

FIG. 7 illustrates distributed data and a path traversal in an example key-value store, according to one embodiment. An application issues a file access command to access File01 stored in the KV store 720a via the POSIX API 711. The file access command from the application invokes a generic VFS call in the VFS 712. The VFS 712 directs the VFS call to a KVFS call in the KVFS 713. In the KVFS 713, the requested file File01 is stored in the directory Root/Dir0.

The KVFS 713 includes inodes 750, 751, 752, and 753. The inode 750 corresponds to the root directory of the KVFS that contains three entries including two directories Dir0 and Dir1 and a file File1. The subdirectory Dir0 of the root contains three entries including two directories Dir01 and Dir02 and a file File01. The subdirectory Dir1 of the root corresponds to the inode 753 and contains attributes but no entries. The requested file File01 is stored in the inode 751. According to one embodiment, the inode 750 is a container directory including key-value pairs for the subdirectories Dir0 and Dir1.

Lookups inside a directory can be completely offloaded to the KV store 720. The number of I/O operations is bounded and is equal to the number of subdirectories in a traversed path. In the present example, two I/O operations can get to the requested file File01 including the I/O operation to the inode 750 and another I/O operation to the inode 751. In contrast, path traversal in a conventional file system can take multiple I/O operations depending on several factors, for example, the number entries in each subdirectory in the path and how the metadata is managed. The lookup of entries in an inode to find the next inode in the path is offloaded to the KV store 720. The performance of the KVFS can be further improved by efficient arrangement and management of the keys stored in the KV stores.

The KVFS call corresponding to the application's file access command to the File01 enables an access to the KV store 720a that stores the actual data of the File01. The KVAPI 714 provides the file access interface to the KV store 720a.

According to one embodiment, the present KVFS requires no metadata to manage data blocks. The block management is completely offloaded to the KV store using key-value pairs. The KV store can efficiently manage the data blocks by storing data for a file in one or more data blocks in the same container. In some embodiment, the data blocks of a file can be stored in more than one containers or more than one KV stores. For example, a replicated data may be stored in a KV store that is geographically separated from the KV store that stores the original data. In this case, an inode of the KVFS can have a key-value tuple, for example, (KV store id, key, container id). This allows the KVFS to span multiple KV stores as identified by the KV Store id.

According to one embodiment, a file system includes: an application programming interface (API) configured to provide a file system access to an application running on a host computer; a key value file system configured to represent a file or a directory as an inode including one or more key-value pairs; a virtual file system configured to direct a file system call received from the application to the key value file system; and a key value API configured to provide the file system access to data stored in a data storage device. Each key-value pair contained in the inode includes a name of the file or the directory as a key and an identifier of a container that is associated with the file or the directory as a value. The data of the file is stored in the data storage device as being divided into one or more data blocks of a fixed size, and each of the one or more data blocks associated with the data of the file is accessible within the key value file system using the one or more key-value pairs.

The API may be portable operating system interface for Unix (POSIX) API, and an operating system of the file system may be Linux.

Attributes of the inode may be stored in a key-value pair of the one or more key-value pairs.

The directory may be represented by either a container directory or an inline directory depending on a number of key-value pair entries contained in the container of the directory.

The container of the inline directory may include a single key-value pair. The value of the single key-value pair may include attributes of the inline directory and one or more key-value pairs corresponding to one or more subdirectories of the inline directory or one or more files stored in the inline directory.

The inline directory may be converted to the container directory when the number of entries exceeds a predetermined size, and the container directory may be converted to the inline directory when the number of entries is reduced below the predetermined size.

The file may be represented by either a container file or an inline file depending on a number of key-value pair entries contained in the container of the file.

The container of the container file may include one or more key-value pairs corresponding to the one or more data blocks of the data for the container file.

The container of the inline file may include one or more key-value pairs, and at least one key-value pair of the one or more key-value pairs may include a name of the inline file and data associated with the inline file. The data of the at least one key-value pair includes one or more key-value pairs corresponding to data blocks storing data of the inline file.

The inline file may be converted to the container file when the number of entries in the container of the inline file exceeds a predetermined size, and the container file may be converted to the inline file when the number of entries is reduced below the predetermined size.

The file may be stored in a plurality of data storage devices, and the inode may include one or more key-value tuples including an identifier of the data storage device, an identifier of the container, and the key.

The file may be truncatable or deletable in a single I/O operation within the key value file system without traversing layers of metadata corresponding to one or more directories within which the file is stored.

According to another embodiment, a method includes: storing a file or a directory in a data storage device as an inode including one or more key-value pairs in a key value file system; receiving a file system access request from an application running on a host computer; directing the file system access request to a file system call to the data storage device; and providing the file system access to data stored in the data storage device. Each key-value pair contained in the inode includes a name of the file or the directory as a key and an identifier of a container that is associated with the file or the directory as a value. The data of the file is stored in the data storage device as being divided into one or more data blocks of a fixed size, and each of the one or more data blocks associated with the data of the file is accessible within the key value file system using the one or more key-value pairs.

The file system access request from the application may be received via POSIX API, and an operating system of the key value file system may be Linux.

Attributes of the inode may be stored in a key-value pair of the one or more key-value pairs.

The directory may be represented by either a container directory or an inline directory depending on a number of key-value pair entries contained in the container of the directory.

The container of the inline directory may include a single key-value pair. The value of the single key-value pair may include attributes of the inline directory and one or more key-value pairs corresponding to one or more subdirectories of the inline directory or one or more files stored in the inline directory.

The inline directory may be converted to the container directory when the number of entries exceeds a predetermined size, and the container directory may be converted to the inline directory when the number of entries is reduced below the predetermined size.

The file may be represented by either a container file or an inline file depending on a number of key-value pair entries contained in the container of the file.

The container of the container file may include one or more key-value pairs corresponding to the one or more data blocks of the data for the container file.

The container of the inline file may include one or more key-value pairs, and at least one key-value pair of the one or more key-value pairs may include a name of the inline file and data associated with the inline file. The data of the at least one key-value pair may include one or more key-value pairs corresponding to data blocks storing data of the inline file.

The inline file may be converted to the container file when the number of entries in the container of the inline file exceeds a predetermined size, and the container file may be converted to the inline file when the number of entries is reduced below the predetermined size.

The file may be stored in a plurality of data storage devices, and the inode may include one or more key-value tuples including an identifier of the data storage device, an identifier of the container, and the key.

The method may further include: truncating or deleting the file in a single I/O operation within the key value file system without traversing layers of metadata corresponding to one or more directories within which the file is stored.

The above example embodiments have been described hereinabove to illustrate various embodiments of implementing a key value file system and a method of managing files and directories using the key value file system. Various modifications and departures from the disclosed example embodiments will occur to those having ordinary skill in the art. The subject matter that is intended to be within the scope of the invention is set forth in the following claims.

What is claimed is:

1. A file system comprising:
an application programming interface (API) configured to provide a file system access to an application running on a host computer;
a key value file system configured to represent a file or a directory as an inode including one or more key-value pairs;
a virtual file system configured to direct a file system call received from the application to the key value file system; and
a key value API configured to provide the file system access to data stored in a data storage device,
wherein each key-value pair contained in the inode includes a name of the file or the directory as a key and an identifier of a container that is associated with the file or the directory as a value,
wherein the data of the file is stored in the data storage device as being divided into one or more data blocks of a fixed size, and each of the one or more data blocks associated with the data of the file is accessible within the key value file system using the one or more key-value pairs,
wherein the data storage device stores the inode as a container inode or an inline inode depending on a predetermined number of entries in the inode, and
wherein the container inode includes one or more key-value pairs corresponding to each of the entries, and the inline inode includes a single key-value pair, a value of the single key-value pair includes a list of attributes corresponding to the entries.

2. The file system of claim 1, wherein the API is portable operating system interface for Unix (POSIX) API, and an operating system of the file system is Linux.

3. The file system of claim 1, wherein attributes of the inode are stored in a key-value pair of the one or more key-value pairs.

4. The file system of claim 1, wherein the directory is represented by either a container directory or an inline directory depending on a number of key-value pair entries contained in the container of the directory.

5. The file system of claim 4, wherein the container of the inline directory includes a single key-value pair, and wherein the value of the single key-value pair includes attributes of the inline directory and one or more key-value pairs corresponding to one or more subdirectories of the inline directory or one or more files stored in the inline directory.

6. The file system of claim 4, the inline directory is converted to the container directory when the number of entries exceeds a predetermined size, and the container directory is converted to the inline directory when the number of entries is reduced below the predetermined size.

7. The file system of claim 1, wherein the file is represented by either a container file or an inline file depending on a number of key-value pair entries contained in the container of the file.

8. The file system of claim 7, wherein the container of the container file includes one or more key-value pairs corresponding to the one or more data blocks of the data for the container file.

9. The file system of claim 7, wherein the container of the inline file includes one or more key-value pairs, and at least one key-value pair of the one or more key-value pairs includes a name of the inline file and data associated with the inline file, and wherein the data of the at least one key-value pair includes one or more key-value pairs corresponding to data blocks storing data of the inline file.

10. The file system of claim 7, the inline file is converted to the container file when the number of entries in the container of the inline file exceeds a predetermined size, and the container file is converted to the inline file when the number of entries is reduced below the predetermined size.

11. The file system of claim 1, wherein the file is stored in a plurality of data storage devices, and the inode includes one or more key-value tuples including an identifier of the data storage device, an identifier of the container, and the key.

12. The file system of claim 1, wherein the file is truncatable or deletable in a single I/O operation within the key value file system without traversing layers of metadata corresponding to one or more directories within which the file is stored.

13. A method comprising:
storing a file or a directory in a data storage device as an inode including one or more key-value pairs in a key value file system;
receiving a file system access request from an application running on a host computer;
directing the file system access request to a file system call to the data storage device; and
providing the file system access to data stored in the data storage device,
wherein each key-value pair contained in the inode includes a name of the file or the directory as a key and an identifier of a container that is associated with the file or the directory as a value, wherein the data of the file is stored in the data storage device as being divided into one or more data blocks of a fixed size, and each of the one or more data blocks associated with the data of the file is accessible within the key value file system using the one or more key-value pairs, wherein the data storage device stores the inode as a container inode or an inline inode depending on a predetermined number of entries in the inode, and wherein the container inode includes one or more key-value pairs corresponding to each of the entries, and the inline inode includes a single key-value pair, a value of the single key-value pair includes a list of attributes corresponding to the entries.

14. The method of claim 13, wherein the file system access request from the application is received via POSIX API, and an operating system of the key value file system is Linux.

15. The method of claim 13, wherein attributes of the inode is stored in a key-value pair of the one or more key-value pairs.

16. The method of claim 13, wherein the directory is represented by either a container directory or an inline directory depending on a number of key-value pair entries contained in the container of the directory.

17. The method of claim 16, wherein the container of the inline directory includes a single key-value pair, and wherein the value of the single key-value pair includes attributes of the inline directory and one or more key-value pairs corresponding to one or more subdirectories of the inline directory or one or more files stored in the inline directory.

18. The method of claim 16, the inline directory is converted to the container directory when the number of entries exceeds a predetermined size, and the container directory is converted to the inline directory when the number of entries is reduced below the predetermined size.

19. The method of claim 13, wherein the file is represented by either a container file or an inline file depending on a number of key-value pair entries contained in the container of the file.

20. The method of claim 19, wherein the container of the container file includes one or more key-value pairs corresponding to the one or more data blocks of the data for the container file.

21. The method of claim 19, wherein the container of the inline file includes one or more key-value pairs, and at least one key-value pair of the one or more key-value pairs includes a name of the inline file and data associated with the inline file, and wherein the data of the at least one key-value pair includes one or more key-value pairs corresponding to data blocks storing data of the inline file.

22. The method of claim 19, the inline file is converted to the container file when the number of entries in the container of the inline file exceeds a predetermined size, and the container file is converted to the inline file when the number of entries is reduced below the predetermined size.

23. The method of claim 13, wherein the file is stored in a plurality of data storage devices, and the inode includes one or more key-value tuples including an identifier of the data storage device, an identifier of the container, and the key.

24. The method of claim 13, further comprising: truncating or deleting the file in a single I/O operation within the key value file system without traversing layers of metadata corresponding to one or more directories within which the file is stored.

* * * * *